US008812737B2

(12) United States Patent
Bilinski et al.

(10) Patent No.: US 8,812,737 B2
(45) Date of Patent: Aug. 19, 2014

(54) CONTEXT-SPECIFIC UNICODE CHARACTERS IN SHORTENED URLS

(75) Inventors: Brandon Bilinski, San Francisco, CA (US); Stephen Kirkham, San Francisco, CA (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 13/236,203

(22) Filed: Sep. 19, 2011

(65) Prior Publication Data

US 2013/0073745 A1    Mar. 21, 2013

(51) Int. Cl.
*G06F 15/16* (2006.01)
*G06F 17/30* (2006.01)
*G06F 17/22* (2006.01)
*H04L 29/12* (2006.01)

(52) U.S. Cl.
CPC .... *G06F 17/30887* (2013.01); *G06F 17/30876* (2013.01); *G06F 17/2223* (2013.01); *G06F 17/30899* (2013.01); *H04L 29/1266* (2013.01); *H01L 61/303* (2013.01); *H04L 61/3025* (2013.01); *H04L 29/12594* (2013.01); *H04L 61/3035* (2013.01); *H04L 61/301* (2013.01)
USPC .......................................... 709/246; 709/217

(58) Field of Classification Search
CPC . H04L 61/303; H04L 61/3035; H04L 61/301; H04L 61/3025; H04L 29/12594; H04L 29/1266; G06F 17/30887; G06F 17/2223; G06F 17/30876; G06F 17/30899
USPC ................................................ 709/246, 217
See application file for complete search history.

(56) References Cited

U.S. PATENT DOCUMENTS

| 2004/0044791 | A1* | 3/2004 | Pouzzner ...................... 709/245 |
| 2007/0124414 | A1* | 5/2007 | Bedingfield et al. .......... 709/217 |
| 2008/0010683 | A1* | 1/2008 | Baddour et al. ................ 726/24 |

OTHER PUBLICATIONS

Jason Fitzpatrick, Tinyarro.ws: Because TinyURLs Just Aren't Tiny Enough, LIFEHACKER.COM (Mar. 11, 2009).*
MaXltweet, Unicode Characters, Feb. 25, 2011, 3 pages.*
"A first Silex Project, " *Synfony*, accessed at http://sf.khepin.com/2011/04/a-first-silex-project/, accessed on Mar. 7, 2013, 12 pages (Apr. 2011)
International Search Report and Written Opinion for International Application PCT/US2012/055734, European Patent Office, Rijswijk, Netherlands, mailed on Jan. 9, 2013.
"URL shortening," *Wikipedia*, accessed at http://en.wikipedia.org/w/index.php?title=URL_shortening&oldid=426714039, accessed on Mar. 11, 2013, 7 pages (Apr. 2011).

* cited by examiner

*Primary Examiner* — Oleg Survillo
(74) *Attorney, Agent, or Firm* — Sterne, Kessler, Goldstein & Fox P.L.L.C.

(57) ABSTRACT

Methods, systems, and apparatuses for generating a shortened context-specific URL are provided. An exemplary method for generating a shortened context-specific URL includes identifying a first service associated with a first URL, where the first URL includes a first quantity of characters, and the first service maps to a first Unicode character that provides context for underlying subject matter found at the first URL. The exemplary method further includes generating a second URL that includes a second quantity of characters, where the second URL includes the first Unicode character as part of the domain name and at least one additional character outside the domain name, and the second quantity of characters is less than the first quantity of characters. The exemplary method also includes mapping the second URL to the first URL.

23 Claims, 5 Drawing Sheets

CONTEXT-SPECIFIC UNICODE CHARACTERS IN SHORTENED URLS

BACKGROUND

A uniform resource locator (URL) may typically contain a large number of characters. A uses may want to shorten a URL for a number of reasons. For example, some web sites allow a user to post messages but limit the quantity of characters in the message. If the user wants to include a URL in the message, the URL may take up a considerable amount of space in the message.

A URL shortening service can shorten the URL into a shorter URL. The shorter URL typically contains a subset of characters contained in the original URL.

BRIEF SUMMARY

Embodiments include providing context-specific Unicode characters in shortened URLs. An exemplary method includes identifying a service associated with a first URL, where the first URL includes a first quantity of characters. The service maps to a Unicode character that provides context for underlying subject matter found at the first URL. The exemplary method further includes generating a second URL that includes a second quantity of characters. The second URL includes the Unicode character as part of the domain name and at least one additional character outside the domain name, and the second quantity of characters is less than the first quantity of characters. The exemplary method also includes mapping the second URL to the first URL.

Other embodiments include corresponding systems, apparatuses, and computer program products configured to perform the actions of these methods, encoded on computer storage devices.

Further embodiments, features, and advantages as well as the structure and operation of the various embodiments are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

I. Overview
II. System Architecture
III. Exemplary Process Flow Diagram
IV. Exemplary Methods
V. Conclusion

I. OVERVIEW

This specification generally relates to context-specific Unicode characters in shortened URLs.

A user may wish to share content of a web page located at a first URL. The first URL can be shortened into a second URL that is shared with other users. The second URL is a shortened context-specific URL that provides context for underlying subject matter found at the first URL. Users clicking on the second URL are redirected to content of the first URL. Users can access content of the web page using the shortened context-specific URL.

In an embodiment, a service associated with a first URL is identified. The service maps to a Unicode character that provides context for underlying subject matter found at the first URL. A second URL that includes the Unicode character as part of the domain name and at least one additional character outside the domain name is generated. The second URL includes fewer characters than the first URL. The second URL is mapped to the first URL.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which the specification would be of significant utility. Therefore, the detailed description is not meant to limit the embodiments described below.

II. SYSTEM ARCHITECTURE

Figure 1:
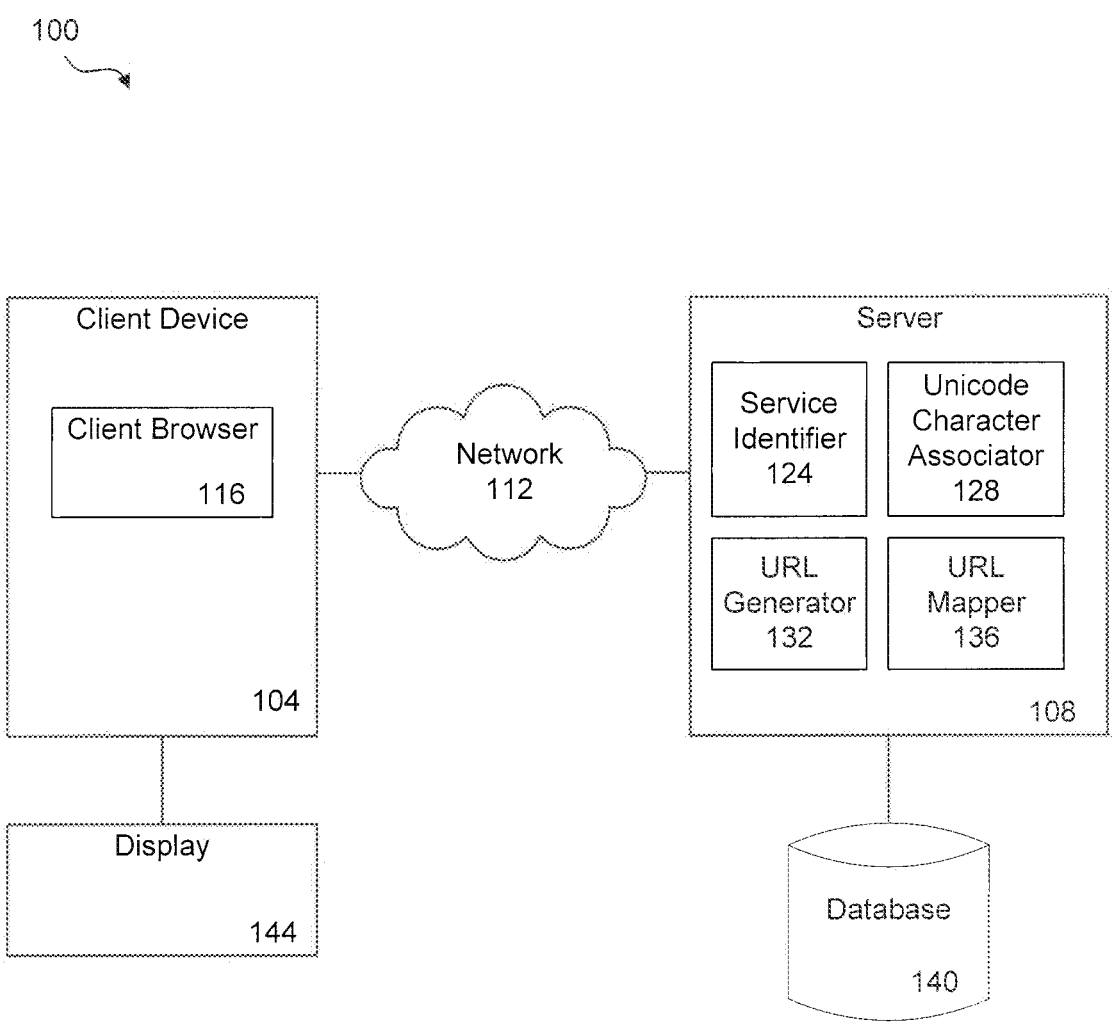
FIG. 1 is a diagram illustrating a system for generating a shortened context-specific URL, according to an embodiment.

FIG. 1 is a diagram illustrating a system 100 for generating a shortened context-specific URL, according to an embodiment. System 100 includes a client device 104 that is communicatively coupled to a server 108 via a network 112. Although system 100 is described herein with reference to one client device and one server, one of skill in the art will recognize that system 100 may also include more than one client device and more than one server without departing from the spirit and scope of the present disclosure.

Client device 104 includes a client browse 116. Web browsers are software applications that allow a user to view or download content that is available on a network, such as on a website on the World Wide Web. Content may include, for example and without limitation, text, files, images, audio, video and personal communications. Web pages present such content and are located using uniform resource identifiers (URI) such as a uniform resource locator (URL). Web pages may be retrieved using the Internet Protocol (IP) address of the computer holding the web page content. Browsers may use a number of protocols and standards to obtain or manage content flow. Many browsers use HTTP to fetch content and web pages. HTTP can be used for requesting and retrieving objects from a server.

Client browser 116 may accept input from a user to shorten a first URL. Based on the input, client browser 116 sends a request to shorten the first URL to server 108 over network 112. Server 108 receives the request and generates a second URL to return to client browser 116. The second URL may be a shortened context-specific URL. The shortened context-specific URL includes fewer characters than the first URL and also indicates to a user the underlying subject matter found at the first URL. The shortened context-specific URL can be shared with other users and allows them to access content of the first URL.

Server 108 includes a service identifier 124, Unicode character associator 128, URL generator 132, and URL mapper 136. Server 108 can search for and store URL information in database 140.

Service identifier 124 identifies a service associated with the first URL. A service can refer to one or more domains or types of services offered by a web page. Nonlimiting examples of services are music services, travel services, movie services, and messaging services (e.g., e-mail messaging). Information about services may be stored in database 140.

In an embodiment, service identifier 124 identifies a service based on a domain name of a first URL. For example, if a domain name of the first URL is "www.music.com", service identifier 124 searches database 140 for a service associated with "www.music.com". In this example, database 140 may have an entry that associates "www.music.com" with a music service. Accordingly, service identifier 124 may identify the service (e.g., music service) associated with the first URL (e.g., "www.music.com").

Services may map to Unicode characters that provide context for underlying subject matter found at associated URLs. The Unicode characters correspond to subject matter of the first URL. In the example above, the music service may map to a Unicode character that indicates affiliation with music such as a musical note, or "♪".

Unicode may represent different types of symbols or characters across all languages worldwide. Unicode provides a unique number for a character, and is supported in many operating systems and modern browsers. In one embodiment, a Unicode character is based on a character that is exclusive of Latin characters. In another embodiment, a Unicode character is based on a character that is exclusive of ASCII characters.

Unicode character associator 128 associates the Unicode character with the first URL. Unicode character information may be stored in database 140. Referring to the example above, a Unicode character that provides context for underlying subject matter found at "www.music.com" may be a Unicode character that indicates affiliation with music. For example, the Unicode character can be a musical note, musical instrument (e.g., guitar), or radio.

URL generator 132 generates a second URL that includes the first Unicode character and at least one additional character. A URL may include a domain name and an optional path. In an embodiment, the second URL includes the first Unicode character in the domain name followed by a slash and at least one additional character. The additional characters can be generated randomly and included in the second URL. The second URL can be a shortened context-specific URL that indicates context for the first URL. URL generator 132 can send the second URL to a client application such as client browser 116.

In one example application, a user may want to share a song provided through a music service. The user can share a shortened context-specific URL that includes an indication that it is associated with music, and redirects users to the song. In this embodiment, the shortened context-specific URL can be selected or copied and pasted into a browser.

The first URL has a first quantity of characters and the second URL has a second quantity of characters, such that the second quantity of characters is less than the first quantity of characters. Referring to the above example, if the first URL is "www.music.com/thisSong" and the first Unicode character associated with the domain name of the first URL is "♪", an example second URL can be "www.♪.com/de". The example second URL is a shortened context-specific URL for first URL "www.music.com/thisSong".

In one embodiment, the first Unicode character is a host URL. Referring to the example above, the second URL is described as having a host URL "♪.com" that includes one Unicode character. In an embodiment, a shortened context-specific URL may include more than one Unicode character (e.g., two, three, four, or more Unicode characters). The Unicode characters may be the same as or different from one another. In one example, a shortened context-specific URL can be "♪ ♪ .com". In another example, a shortened context-specific URL can be "♫ ♪ .com". In another example, a shortened context-specific URL can be "♫ .com".

A domain may be unique depending on the content being shared or depending on the service. In one example, the domain "www.♪.com" may be unique to the music service, and used for all content associated with any music services.

If a Unicode character corresponding to a service has already been taken by a first web site, a different Unicode character or combinations of Unicode characters corresponding to the service may be used to associate a second web site with the service. In one example, if the Unicode character "♪" corresponds to a music service and is taken by "www.music.com", a different Unicode character (e.g., "♫") or combinations of Unicode characters (e.g., "♪ ♪") corresponding to a music service may be used to associate "www.thismusic.com" with the music service.

URL mapper 136 can store the URL mappings in database 140. In one embodiment, URL mapper 136 can provide an instruction to send the first URL to a client application when a request for a web page associated with the second URL is received from the client application. The client application may then request content of the first URL. In another embodiment, URL mapper 136 can provide an instruction to send a web page associated with the first URL to a client application when a request for a web page associated with the second URL is received from the client application.

In the above example, URL mapper 136 can store a mapping of "www.♪.com/de" to "www.music.com/thisSong". In this example, when client browser 116 requests content from shortened context-specific URL "www.♪.com/de", server 108 receives the request and redirects client browser 116 to first URL "www.music.com/thisSong".

When content of the second URL is requested by client browser 116 (e.g., when a user selects the second URL or enters the second URL into an address bar), server 108 redirects a user to content of the first URL. It is unnecessary for the user to type the first URL into an address bar of client browser 116.

In an embodiment, server 108 receives the request for content of the second URL, determines the first URL to which the second URL maps using URL mapper 136, and sends to client browser 116 a response that includes the content of the first URL.

In one embodiment, system 100 may be configured to handle HTTP. Server 108 may redirect client browser 116 using an HTTP redirect. In one example, client browser 116 sends an HTTP request to server 108 for content of the second URL, and server 108 returns an HTTP response that includes the first URL. The first URL may be included in a header of the HTTP response or a body of the HTTP response. Client browser 116 may parse the HTTP response and send an HTTP request for content of the first URL.

In another embodiment, system 100 may be configured to handle other protocols involved in interne or network communication.

In another embodiment, server 108 sends a document (e.g., HTML document) to client browser 116 in response to a request for content of the second URL. The document may specify the first URL and refresh the displayed page with the web page associated with the first URL after a certain amount of time. In one example, the document can be an HTML document that includes at least one tag (e.g., meta tag) that specifies the first URL and a time period of delay before refreshing the displayed page. The time period of delay may be 0 seconds or greater.

In yet another embodiment, server 108 returns a web page to client browser 116 that requests the user to click on a link to the first URL. This may allow client browsers that do not support automatic redirects to still reach the target document by selecting the link.

Client device 104 is coupled to a display device 144. When client browser 116 receives the web page, client browser 116 can render the web page for a user via display device 144. Display device 144 can be, for example and without limitation, a liquid crystal display, a plasma display, a variable graphics array (VGA) display, a super VGA display, and a cathode ray tube display, and other similar types of display devices. In one embodiment, display device 144 can be configured to display a graphical user interface (GUI) that provides an interface between a user and computer system 100 or an application running on computer system 100 (also referred to herein as a "system application").

Server 108 can be, for example and without limitation, a telecommunications server, a web server, or other type of database server that supports web protocols such as HTTP. For example, server 108 may be a web server that contains web applications which generate content in response to an HTTP request. The web server may package the generated content and serve the content to a client in the form of an HTTP response. A web server may be a software component that responds to an HTTP request with an HTTP reply. As illustrative examples, the web server may be, without limitation, Apache HTTP Server, Apache Tomcat, Microsoft Internet Information Server, JBoss Application Server, WebLogic Application Server, or Sun Java System Web Server. The web server may serve content such as hypertext markup language (HTML), extendable markup language (XML), documents, videos, images, multimedia features, or any combination thereof. This example is strictly illustrative and does not limit the present disclosure.

Client browser 116 can run on any computing device. Similarly, server 108 can be implemented using any computing device capable of serving data to the client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet, or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware car include, but is not limited to, a processor, memory and user interface display.

Network 112 can be any network or combination of networks that can carry data communication, and may be referred to herein as a computer network. Such network 112 can include, but is not limited to, a wired (e.g., Ethernet) or a wireless (e.g., Wi-Fi and 3G) network, a local area network, medium area network, and/or wide area network such as the Internet. Network 112 can support protocols and technology including, but not limited to, World Wide Web protocols and/or services. Intermediate web servers, gateways, or other servers may be provided between components of communication system 100 depending upon a particular application or environment.

Each of service identifier 124, Unicode character associator 128, URL generator 132, and URL mapper 136 may be implemented as software, hardware, firmware, or any combination thereof. Some embodiments of service identifier 124, Unicode character associator 128, URL generator 132, and URL mapper 136, or portions thereof, can also be implemented as computes-readable code executed on one or more computing devices capable of carrying out the functionality described herein.

Note that in alternative embodiments, any subset of the components shown in FIG. 1 may in fact be embodied as a single component. For example, the functionalities of service identifier 124 and Unicode character associator 128 may be combined in a single device or module. Other combinations of the functional components of FIG. 1 are also possible, as would be known to a person of skill in the art. Further, server 108 may have more or fewer than the components shown in FIG. 1.

Unicode characters can convey a lot of meaning in just one character. For example, Unicode characters can be internationally recognized. Referring to the above example, a user may not understand "www.music.com", for example, because the user does not understand English. The symbol "♪" is not part of any specific language and is typically not included on a keyboard. The symbol "♪" is internationally recognized as being associated with music and has meaning across many languages and cultures. As such, the user may understand that the musical note Unicode character corresponds to music and that the URL "www.♪.com" is affiliated with music. It may be unnecessary for the user to understand English or any other particular language to understand corresponding subject matter of shortened context-specific URLs.

In an embodiment, a shortened context-specific URL can be provided as a set of characters that a user is able to copy and paste. For example, a user can request a first URL to be shortened into a second URL. A user can access content associated with the first URL by copying and pasting the second URL into a browser.

Unicode characters can be automatically generated and used in shared links that are clicked. In an embodiment, a shortened context-specific URL can be provided as a link that a user is able to select to access content of the longer URL. For example, a user can request a first URL to be shortened into a second URL. The shortened context-specific URL can be provided as a link, and users can access content associated with the first URL by selecting the link.

In an embodiment, an advantage of using a Unicode character in shortened context-specific URLs is that a user can select the shortened context-specific URL to access content of a longer URL. It is unnecessary for the user to type the longer URL into an address bar of a browser. It is also unnecessary for the user to type the Unicode character into the address bar. Unicode characters may be difficult to type into a web browser because they may not be a part of an official language and may not be included on keyboards.

In an embodiment, a shortened context-specific URL can be recognized as being associated with a particular company, domain name, or web site. For example, if a web site "www.cats.com" provided shortened context-specific URLs that included a cat Unicode character, it would be associated with the web site "www.cats.com". As such, when a user sees any URL that includes the cat Unicode character, the user may immediately understand that the shortened context-specific URL refers to content associated with "www.cats.com".

III. EXEMPLARY PROCESS FLOW DIAGRAM

Figure 2:
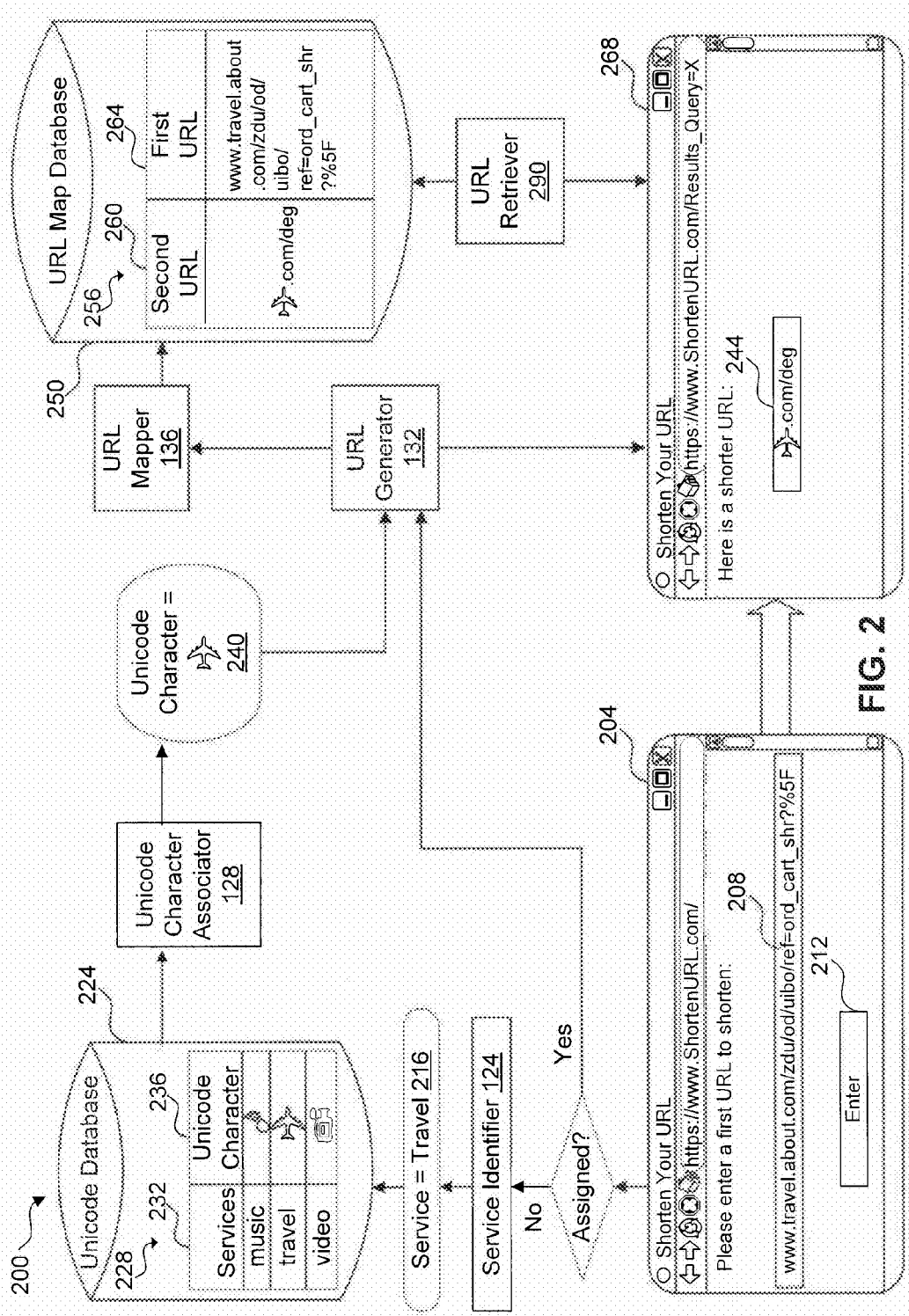
FIG. 2 is an example of an exemplary process flow diagram for generating a shortened context-specific URL, according to an embodiment.

FIG. 2 is an example of an exemplary process flow diagram 200 for generating a shortened context-specific URL, according to an embodiment.

A user may desire to shorten a first URL into a context-specific URL to access or share content of the first URL. A web page 204 may provide URL shortening services and include a field that allows users to enter a first URL to shorten. A user may input a first URL 208 "www.travel.about.com/zdu/od/uibo/ref=ord_cart_shr?%5F" to shorten into web page 204. The user can select a button "Enter" 212 to submit a request to shorten first URL 208 into a context-specific URL that can be used to access content at first URL 208.

When the user submits a request to shorten a URL, it is determined whether the domain has previously been associated with a Unicode character. If the domain has not previously been associated with a Unicode character, process flow proceeds to service identifier 124.

Service identifier 124 receives first URL 208, and can identify a service associated with first URL 208. Service identifier 124 identifies a travel service 216 associated with first URL 208. In an embodiment, service identifier 124 identifies the travel service as being associated with first URL 208 based or a domain name of first URL 208 (e.g., "www.travel.com").

Unicode database 224 stores information on services and Unicode character relationships. Unicode database 224 may store identifications of services mapped to Unicode characters that provide context for underlying subject matter found at the services. The database identifications can include a first service associated with a first Unicode character and a second service associated with a second Unicode character, where the first service is different from the second service, and the first Unicode character is different from the second Unicode character.

Unicode database 224 includes a service-Unicode character table 228. Service-Unicode character table 228 stores mappings of services to Unicode characters that provide context for underlying subject matter found at associated URLs. Service-Unicode character table 228 includes a column "Services" 232 that shows services provided to users over a network. Column "Services" 232 lists music services, travel services, and video services.

Service-Unicode character table 228 also includes a column "Unicode Character" 236 that shows Unicode characters associated with the services. The Unicode characters are symbols that are affiliated with their associated services. In service-Unicode, character table 228, the music service maps to a musical note Unicode character, the travel service maps to an airplane Unicode character, and the video service maps to a camera Unicode character. Other services and Unicode characters may be included in service-Unicode character table 228. For example, service-Unicode character table 228 may include a messaging service that maps to an envelope Unicode character.

In another embodiment, column "Unicode Character" 236 lists domain names. For example, service-Unicode character table 228 may list that the music service maps to a "www.♪.com," the travel service maps to "www.✈.com", and the video service maps to "www.📷.com". Unicode character associator 128 associates the appropriate Unicode character with the URL to be shortened. In FIG. 2, Unicode character associator 128 associates the airplane Unicode character 240 with first URL 208. Unicode character associator 128 may use service-Unicode character table 228 to associate a Unicode character with the URL to be shortened.

URL generator 132 generates a second URL 244 that includes the first Unicode character-based domain name and at least one additional character. Second URL 244 is "www.✈.com/deg". A quantity of characters of second URL 244 is less than a quantity of characters of first URL 208. When a user sees second URL 244 "www.✈.com/deg", the user can understand that it is associated with travel without any further details. As such, the user may automatically understand that the underlying content of second URL 244 is associated with travel.

URL mapper 136 maps second URL 244 to first URL 208. URL mapper 136 can store mappings of URLs in a URL map database 250. URL map database 250 can include a map table 256 that stores mappings of second URLs to first URLs. Map table 256 includes a column "Second URL" 260 that shows context-specific URLs that, when used, can redirect a user to the first URL. Map table 256 also includes a column "First URL" 264 that shows the URL to be shortened.

Second URL 244 is displayed on a web page 268. A user can share content of first URL 208 by selecting second URL 244. When second URL 244 is selected by a user, the user is redirected to content of first URL 208. An instruction to redirect to a web page associated with the first URL can be provided when a request for a web page associated with the second URL is received.

If the domain has previously been associated with a Unicode character, process flow proceeds to URL generator 132. URL generator 132 consults URL map database 250 to determine whether a shortened context-specific URL has previously been mapped to first URL 208.

If a shortened context-specific URL has previously been mapped to first URL 208, URL generator 132 identifies the shortened context-specific URL. The shortened context-specific URL is displayed on web page 268.

If a shortened context-specific URL has not previously been mapped to first URL 208, URL generator 132 generates second URL 244. Second URL 244 is displayed on web page 268.

In an embodiment, a user can copy and paste second URL 244 into an address field of client browser 116 to access content of first URL 208. The user can also share second URL with others by, for example, copying and pasting second URL 244 into an e-mail message or a social networking web site. Other users can see second URL 244 and copy and paste it. In another embodiment, second URL 244 can be a link that when selected loads a web document referenced by first URL 208. A user can select second URL 244 and automatically be redirected to content of first URL 208.

Figure 3A:
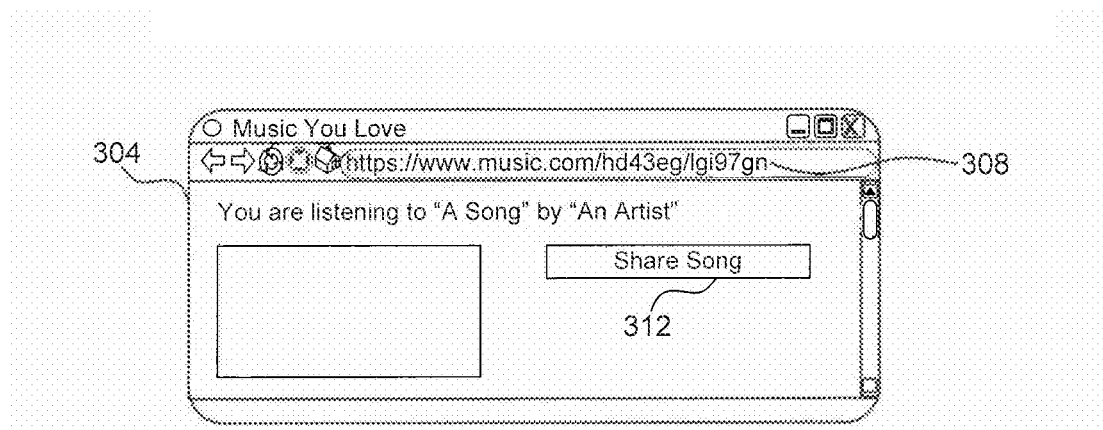
FIGS. 3A-3C are example web pages that illustrate a shortened context-specific URL, according to an embodiment.
Figure 3B:
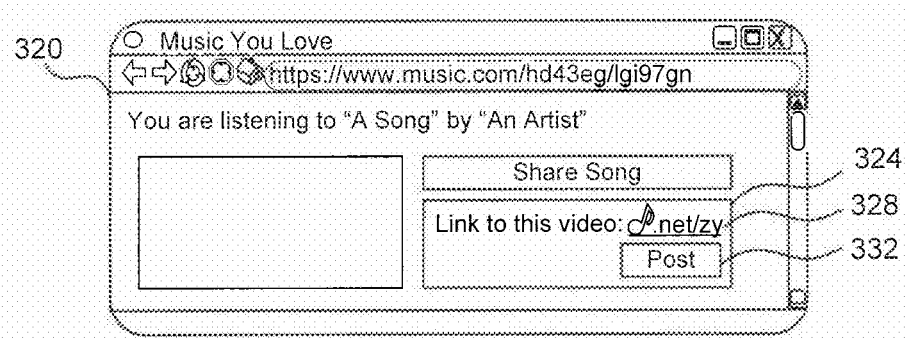
Figure 3C:
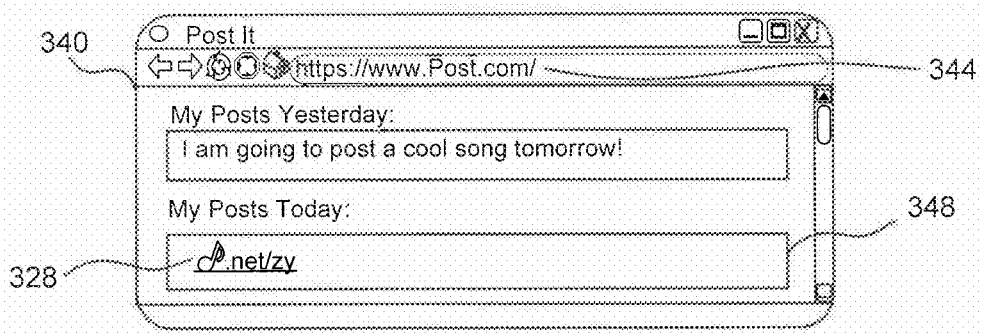

FIGS. 3A-3C are example web pages that illustrate different ways to use shortened context-specific URLs, according to an embodiment.

In FIG. 3A, a user accesses a web page 304 associated with a music service. The user can listen to a song by an artist via web page 304 referenced by first URL 308. Web page 304 displays an option "Share Song" 312 that allows the user to share the song. In an embodiment, when option "Share Song" 312 is selected, an instruction to generate a shortened context-specific URL is sent to a server. Client browser 116 can receive the second URL from the server and display it on a web page for a user to view.

FIG. 3B shows a web page 320 that may display when the user selects option "Share Song" 312. Web page 320 includes a box 324 that includes a second URL 328. Second URL 328 is a shortened context-specific URL associated with first URL 308. In an embodiment, when option "Share Song" 312 is selected, second URL 328 is automatically generated and included in box 324. In an embodiment, second URL 328 is provided using an application programming interface (API). An API call associated with the service can be invoked.

The user can share her favorite song with other users by providing a short context-specific URL that refers to the song. For example, in an embodiment, second URL 328 can be copied and pasted by the user and shared with other users. The user can also share her favorite song with other users by sharing a link to content that refers to the song. For example, in an embodiment, second URL 328 can be a link that, when selected by a user, performs an action such as redirecting the user to content of first URL 308. Other actions may include reloading the page and restarting the song.

Box 324 includes a share option "Post" 332. When a user selects share option "Post" 332, second URL 328 may be automatically posted to a web page that is referenced by share option "Post" 332.

FIG. 3C shows a web page 340 that may display when the user selects share option "Post" 332. In an embodiment, sending a request to post second URL 328 to the referenced web page includes invoking an API call associated with the web page referenced by share option "Post" 332. An API call associated with the web page referenced by share option "Post" 332 can be invoked when it is selected.

Web page 340 may be referenced by share option "Post" 332 via a third URL 344. The user may be requested to enter a username and password before the user can access the web page and post messages on the web page.

Web page 340 displays second URL 328 in a box 348. Other users may access web page 340. Users may automatically understand that the underlying link is associated with music because of the context-specific URL. Second URL 328 may be selectable by a user. For example, second URL 328 may be a hyperlink in a text-limited field. In an embodiment, a user can access the song by selecting second URL 328 displayed on web page 340. In this embodiment, web page 304 can be automatically displayed when a user selects second URL 328 on web page 340. Web page 340 may be associated with first URL 308.

In another embodiment, a user can access the song by copying and pasting second URL 328 displayed or web page 340 into client browser 116. In one example, client browser 116 may receive second URL 328 in an address bar of client browser 116. In another example, client browser 116 may receive second URL 328 in a displayed input field associated with a web page. Client browser may display a web page associated with first URL 308 in response to the second URL 328.

In an embodiment, a user may also have an option to type a message in web page 320 of FIG. 2 to be posted to web page 340 in FIG. 3 along with the shared song. For example, a user may share the song along with a message "I love this song!" that gets posted on web page 340.

IV. EXEMPLARY METHODS

Figure 4:
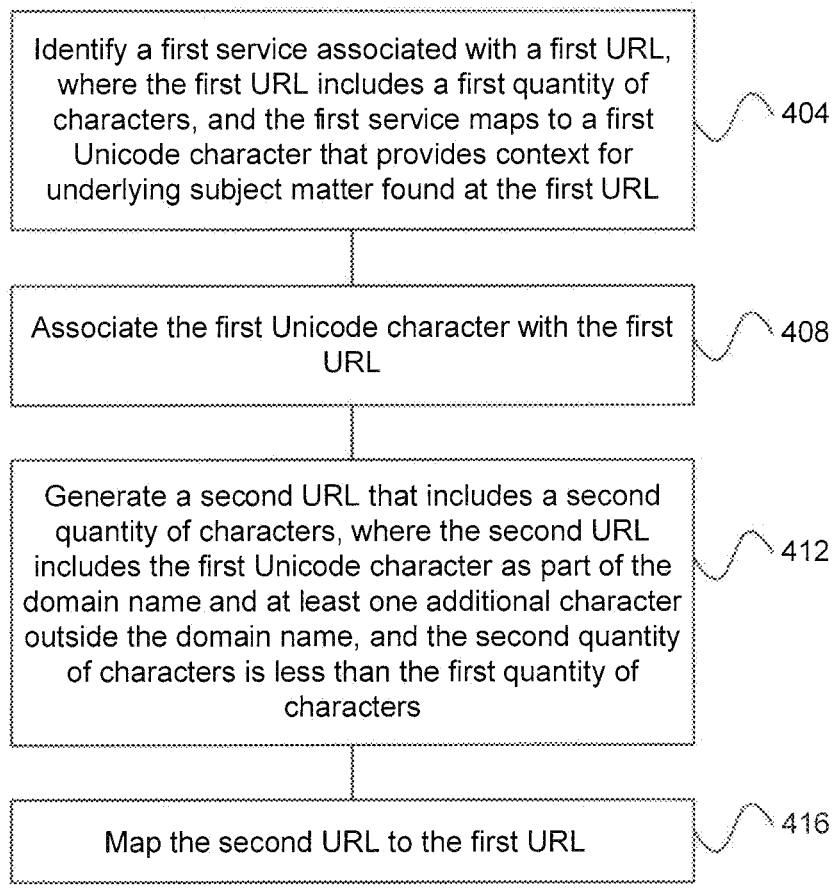
FIG. 4 is a flowchart of an exemplary method for generating a shortened context-specific URL at a server, according to an embodiment.
Figure 5:
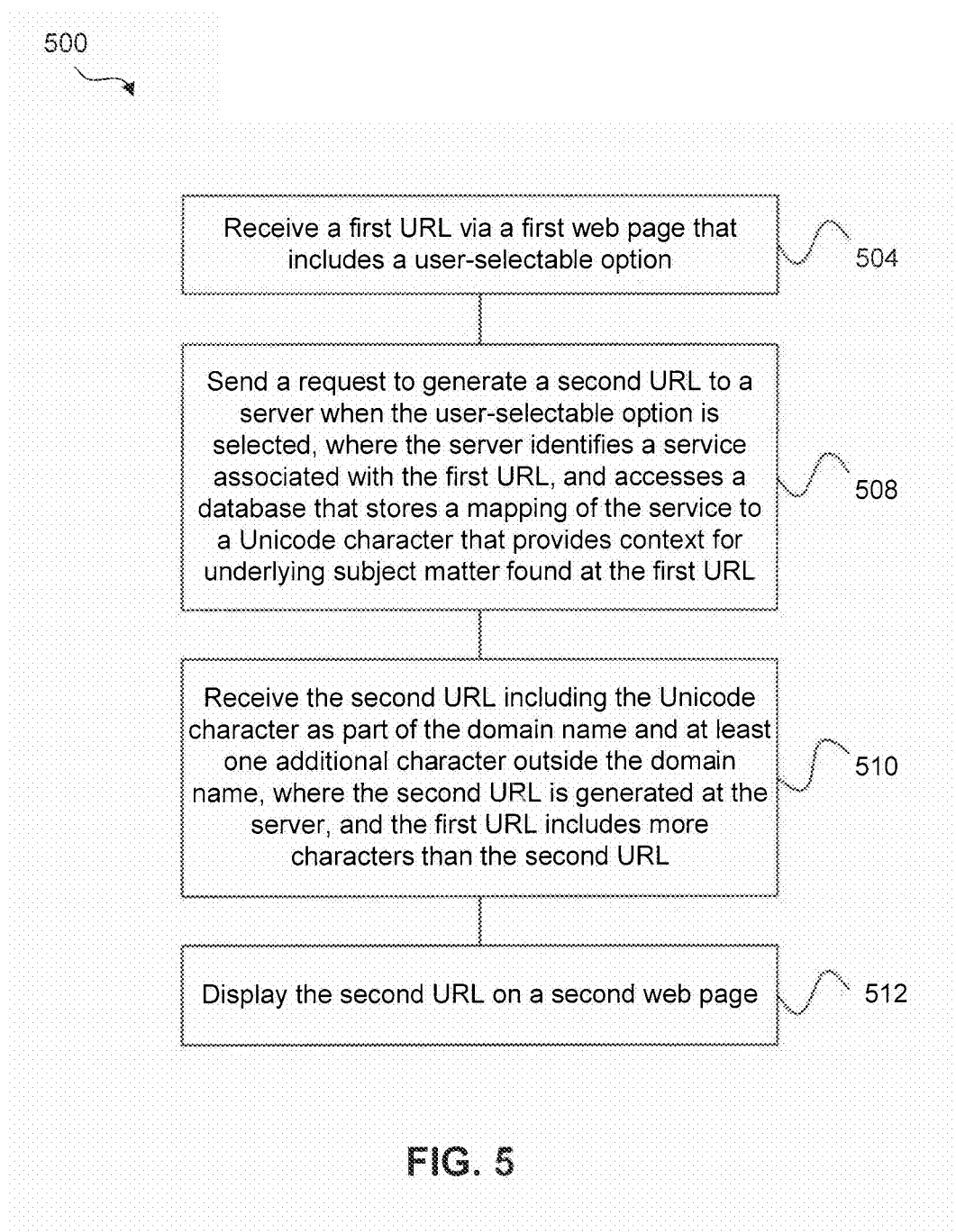
FIG. 5 is a flowchart of another exemplary method for generating a shortened context-specific URL at a client, according to an embodiment.

FIG. 4 is a flowchart of an exemplary method 400 for generating a shortened context-specific URL at a server, according to an embodiment. FIG. 5 is a flowchart of another exemplary method for generating a shortened context-specific URL at a client, according to an embodiment. While methods 400 and 500 are described with respect to embodiments, methods 400 and 500 are not meant to be limiting and may be used in other applications. In the description below, methods 400 and 500 are described with reference to FIG. 1. Methods 400 and 500, however, are not meant to be limited to system 100.

In FIG. 4, at stage 404, a first service associated with a first URL is identified. The first URL includes a first quantity of characters. The first service maps to a first Unicode character that provides context for underlying subject matter found at the first URL. In an embodiment, service identifier 124 identifies a first service associated with a first URL, where the first URL includes a first quantity of characters, and the first service maps to a first Unicode character that provides context for underlying subject matter found at the first URL.

At stage 408, the first Unicode character is associated with the first URL. In an embodiment, Unicode character associator 128 associates the first Unicode character with the first URL.

At stage 412, a second URL that includes a second quantity of characters is generated. The second URL includes the first Unicode character as part of the domain name and at leak one additional character outside the domain name and the second quantity of characters is less than the first quantity of characters. In an embodiment, URL generator 132 generates a second URL that includes a second quantity of characters, where the second URL includes the first Unicode character as part of the domain name and at least one additional character outside the domain name and the second quantity of characters is less than the first quantity of characters.

At stage 416, the second URL is mapped to the first URL. In an embodiment, URL mapper 136 maps the second URL to the first URL.

According to an embodiment, stages 404, 408, 412, and 416 may be performed by components of system 100 or exemplary process flow diagram 200. In other embodiments, stages 404, 408, 412, and 416 may be performed by a single module, for example, service identifier 124.

In FIG. 5, at stage 504, a first URL is received via a first web page that includes a user-selectable option. In an embodiment, client browser 116 receives a first URL via a first web page that includes a user-selectable option.

At stage 508, a request to generate a second URL is sent to a server when the user-selectable option is selected, where the server identifies a service associated with the first URL, and accesses a database that stores a mapping of the service to a Unicode character that provides context for underlying subject matter found at the first URL. In an embodiment, client browser 116 sends a request to generate a second URL to a server when the user-selectable option is selected, where the server identifies a service associated with the first URL, and accesses a database that stores a mapping of the service to a Unicode character that provides context for underlying subject matter found at the first URL.

At stage 510, the second URL including the Unicode character as part of the domain name and at least one additional character outside the domain name is received, where the second URL is generated at the server, and the first URL includes more characters than the second URL. In an embodiment, client browser 116 receives the second URL including the Unicode character as part of the domain name and at least one additional character outside the domain name, where the second. URL is generated at the server, and the first URL includes more characters than the second URL.

At stage 512, the second URL is displayed on a second web page. In an embodiment, client browser 116 displays the second URL on a second web page.

According to an embodiment, stages 504, 508, 510, and 512 may be performed by components of system 100 or exemplary process flow diagram 200. In other embodiments, stages 504, 508, 510, and 512 may be performed by a single module, for example, client browser 116.

V. CONCLUSION

Some embodiments also may be directed to computer program products including software stored on any computer readable medium. Such software, when executed in one or more data processing device, causes a data processing device(s) to operate as described herein. Some embodiments employ any computer useable or readable medium. Examples of computer readable storage media include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the specification that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for generating a shortened context-specific URL, comprising:
   identifying, by a processing device, a first service associated with a first URL based on searching a database for the first service associated with a domain name of the first URL, wherein the first URL comprises a first quantity of characters of the first domain name;
   identifying, by a processing device, a first Unicode character that provides context for an underlying subject matter of the first service based on a pre-existing affiliation between the first service and the first Unicode character;
   generating, by the processing device, a second URL that comprises a second quantity of characters, wherein the second URL comprises the first Unicode character as part of the first domain name that is a top-level domain name of a website and at least one additional character outside the first domain name, and the second quantity of characters is less than the first quantity of characters; and
   mapping, by the processing device, the second URL to the first URL, wherein the second URL is a shortened context-specific URL for the first URL.

2. The computer-implemented method of claim 1, further comprising:
   associating, by the processing device, the first Unicode character with the first URL.

3. The computer-implemented method of claim 2, further comprising:
   sending the second URL to a client application.

4. The computer-implemented method of claim 2, further comprising:
   providing an instruction to send a web page associated with the first URL to a client application when a request for a web page associated with the second URL is received from the client application.

5. The computer-implemented method of claim 2, further comprising:
   providing an instruction to redirect to a web page associated with the first URL when a request for a web page associated with the second URL is received.

6. The computer-implemented method of claim 2, wherein the second URL comprises at least two Unicode characters.

7. The computer-implemented method of claim 2, further comprising:
   identifying, by the processing device, a second service associated with a third URL, wherein the third URL comprises a third quantity of characters, the second service maps to a second Unicode character that provides context for underlying subject matter found at the third URL, and the second Unicode character is different from the first Unicode character;
   associating the second Unicode character with the third URL;
   generating a fourth URL that comprises a fourth quantity of characters, wherein the fourth URL comprises the second Unicode character as part of the second domain name and at least one additional character outside the second domain name, and the fourth quantity of characters is less than the third quantity of characters; and
   mapping the fourth URL to the third URL.

8. A system for providing a shortened context-specific URL comprising a memory and one or more processors, the system further comprising:
- a service identifier, implemented on one of the processors, configured to cause the processor to identify a service associated with a first URL based on searching a database for the service, wherein the service is associated with a domain name of the first URL, wherein the first URL comprises a first quantity of characters of the domain name,
- and wherein there exists a pre-existing affiliation between the service and a first Unicode character that provides context for an underlying subject matter of the service;
- a URL generator, implemented on one of the processors, configured to cause the processor to generate a second URL that comprises a second quantity of characters, wherein the second URL comprises the Unicode character as part of the domain name, wherein the domain name is a top-level domain name of a website, and at least one additional character outside the domain name, and the second quantity of characters is less than the first quantity of characters; and
- a URL mapper configured map the second URL to the first URL, wherein the second URL is a shortened context-specific URL for the first URL.

9. The system of claim 8, further comprising:
- a Unicode character associator, implemented on one of the processors, configured to cause the processor to associate the Unicode character with the first URL.

10. The system of claim 8, wherein the second URL comprises at least two Unicode characters.

11. The system of claim 8, wherein the database stores a mapping of service identifiers and corresponding Unicode characters that provide context for underlying subject matter of the services.

12. The system of claim 11, wherein the mapping comprises a first service associated with a first Unicode character and a second service associated with a second Unicode character, wherein the first service is different from the second service, and the first Unicode character is different from the second Unicode character.

13. The system of claim 11, wherein the mapping comprises at least one of: (i) a service associated with travel mapped to an airplane Unicode character, (ii) a service associated with messages mapped to an envelope Unicode character, (iii) a service associated with video mapped to a video camera Unicode character, and (iv) a service associated with music mapped to a musical note Unicode character.

14. A tangible computer readable memory having instructions encoded therein that, when executed by a computing device, cause the computing device to perform operations comprising:
- identifying a service associated with a first URL based on searching a database for the service associated with a domain name of the first URL, wherein the first URL comprises a first quantity of characters, and the service maps to a first Unicode character that provides context for underlying subject matter associated with the service based on a pre-existing affiliation between the service and the first Unicode character;
- generating a second URL that comprises a second quantity of characters, wherein the second URL comprises the Unicode character as part of the domain name that is a top-level domain name of a website and at least one additional character outside the domain name, and the second quantity of characters is less than the first quantity of characters; and
- mapping the second URL to the first URL, wherein the second URL is a shortened context-specific URL for the first URL.

15. The computer readable memory of claim 14, the operations further comprising:
- associating the Unicode character with the first URL.

16. A computer-implemented method for providing a shortened context-specific URL, comprising:
- receiving a first URL via a first web page that comprises a user-selectable option;
- sending a request to generate a second URL to a server when the user-selectable option is selected, wherein the server identifies a service associated with the first URL based on searching a database for a service associated with a domain name of the first URL, wherein the database stores a mapping of the service to a first Unicode character that provides context for underlying subject matter of the service based on a pre-existing affiliation between the first service and the first Unicode character; and
- displaying the second URL comprising the Unicode character as part of the domain name and at least one additional character outside the domain name on a second web page, wherein the second URL is a shortened context-specific URL for the first URL, wherein the domain name is a top-level domain name of a website, wherein the second URL is generated at the server, and wherein the first URL comprises more characters than the second URL.

17. The computer-implemented method of claim 16, wherein the sending a request comprises invoking an application programming interface call associated with the service.

18. The computer-implemented method of claim 16, wherein the second URL is selectable by a user, further comprising:
- automatically displaying a web page associated with the first URL when a user selects the second URL.

19. The computer-implemented method of claim 16, wherein the second URL is a hyperlink in a text-limited field.

20. The computer-implemented method of claim 16, further comprising:
- receiving the second URL in a displayed input field associated with a web page; and
- displaying a web page associated with the first URL in response to the received second URL.

21. A system for providing a shortened URL comprising a memory and a processor, the processor being configured to:
- receive a first URL via a first web page that comprises a user-selectable option;
- send a request to generate a second URL to a server when the user-selectable option is selected, wherein the server identifies a service associated with the first URL based on searching a database for a service associated with a domain name of the first URL, wherein the database stores a mapping of the service to a first Unicode character that provides context for underlying subject matter of the service based on a pre-existing affiliation between the first service and the first Unicode character; and
- display the second URL comprising the Unicode character as part of the domain name and at least one additional character outside the domain name on a second web page, wherein the second URL is a shortened context-specific URL for the first URL, wherein the domain name is a top-level domain name of a website, wherein the second URL is generated at the server, and wherein the first URL comprises more characters than the second URL.

22. The system of claim 21, wherein the second URL is a hyperlink in a text-limited field.

23. An apparatus comprising at least one computer readable storage memory having instructions encoded therein that, when executed by a computing device, cause the computing device to perform operations comprising:
- receiving a first URL via a first web page that comprises a user-selectable option;
- sending a request to generate a second URL to a server when the user-selectable option is selected, wherein the server identifies a service associated with the first URL based on searching a database for a service associated with a domain name of the first URL, wherein the database stores a mapping of the service to a first Unicode character that provides context for underlying subject matter of the service based on a pre-existing affiliation between the first service and the first Unicode character; and
- displaying the second URL comprising the Unicode character as part of the domain name and at least one additional character outside the domain name on a second web page, wherein the second URL is a shortened context-specific URL for the first URL, wherein the domain name is a top-level domain name of a website, wherein the second URL is generated at the server, and wherein the first URL comprises more characters than the second URL.

* * * * *